United States Patent
Cheng et al.

(10) Patent No.: US 12,517,983 B2
(45) Date of Patent: Jan. 6, 2026

(54) SNR DETECTION WITH FEW-SHOT TRAINED MODELS

(71) Applicant: NEC Laboratories America, Inc., Princeton, NJ (US)

(72) Inventors: Wei Cheng, Princeton Junction, NJ (US); Jingchao Ni, Princeton, NJ (US); Liang Tong, Lawrenceville, NJ (US); Haifeng Chen, West Windsor, NJ (US); Yizhou Zhang, Los Angeles, CA (US)

(73) Assignee: NEC Corporation, Tokyo (JP)

( * ) Notice: Subject to any disclaimer, the term of this patent is extended or adjusted under 35 U.S.C. 154(b) by 239 days.

(21) Appl. No.: 18/452,664

(22) Filed: Aug. 21, 2023

(65) Prior Publication Data

US 2024/0070232 A1     Feb. 29, 2024

Related U.S. Application Data

(60) Provisional application No. 63/408,550, filed on Sep. 21, 2022, provisional application No. 63/399,747, filed on Aug. 22, 2022.

(51) Int. Cl.
    *G06F 18/2413*     (2023.01)
    *G06F 18/2415*     (2023.01)
    *H04B 10/69*       (2013.01)

(52) U.S. Cl.
    CPC .... *G06F 18/24133* (2023.01); *G06F 18/2415* (2023.01); *H04B 10/697* (2013.01)

(58) Field of Classification Search
    CPC ............... H04B 10/697; G06F 18/2415; G06F 18/24133

USPC ......................................................... 398/208
    See application file for complete search history.

(56) References Cited

U.S. PATENT DOCUMENTS

| | | | |
|---|---|---|---|
| 10,963,754 B1 * | 3/2021 | Ravichandran | G06V 10/764 |
| 11,551,004 B2 * | 1/2023 | Wohlwend | G06N 3/08 |
| 2020/0259700 A1 * | 8/2020 | Bhalla | G06F 3/0482 |
| 2021/0201116 A1 * | 7/2021 | Rabinowitz | G06N 3/08 |
| 2022/0129758 A1 * | 4/2022 | Sallee | G06N 3/045 |
| 2023/0076127 A1 * | 3/2023 | Yu | G06F 21/577 |

(Continued)

FOREIGN PATENT DOCUMENTS

| | | | | |
|---|---|---|---|---|
| EP | 3754548 A1 * | 12/2020 | | G06F 18/24133 |
| WO | WO-2021175422 A1 * | 9/2021 | | G06V 10/454 |
| WO | WO-2022076915 A1 * | 4/2022 | | G06V 10/16 |

OTHER PUBLICATIONS

Snell et al; Prototypical Networks for Few-shot Learning ;2017; University of Toronto, pp. 1-13. (Year: 2017).*

(Continued)

*Primary Examiner* — Amritbir K Sandhu
(74) *Attorney, Agent, or Firm* — Vincent Duffy; Joseph Kolodka

(57) ABSTRACT

Methods and systems for training a model include determining class prototypes of time series samples from a training dataset. A task corresponding to the time series samples is encoded using the class prototypes and a task-level configuration. A likelihood value is determined based on outputs of a time series density model, a task-class distance from a task embedding model, and a task density model. Parameters of the time series density model, the task embedding model, and the task density model are adjusted responsive to the likelihood value.

16 Claims, 9 Drawing Sheets

(56) References Cited

U.S. PATENT DOCUMENTS

| | | | |
|---|---|---|---|
| 2023/0236927 A1* | 7/2023 | Tang | G06N 3/0442 |
| | | | 714/15 |
| 2023/0244917 A1* | 8/2023 | Loaiza Ganem | G06N 3/047 |
| | | | 706/16 |
| 2023/0252302 A1* | 8/2023 | Tong | G06N 3/0442 |
| 2024/0064161 A1* | 2/2024 | Liu | H04L 41/069 |
| 2024/0104344 A1* | 3/2024 | Tang | G06N 20/00 |
| 2024/0303149 A1* | 9/2024 | Chen | G06F 11/079 |

OTHER PUBLICATIONS

Zhang et al; Constellation Diagram Analyzer Based on Few Shot Learning ; 2021; Optical Society of America; pp. 1-3. (Year: 2021).*

Zhang et al; (Fast adaptation of multi-task meta-learning for optical performance monitoring; Jul. 2023; Optics Express vol. 31, No. 14, pp. 1-15. (Year: 2023).*

Finn et al., "Model-Agnostic Meta-Learning for Fast Adaptation of Deep Networks", arXiv:1703.03400v3 [cs.LG] Jul. 18, 2017, pp. 1-13.

Snell et al., "Prototypical Networks for Few-shot Learning", arXiv:1703.05175v2 [cs.LG] Jun. 19, 2017, pp. 1-13.

Yao et al., "Hierarchically Structured Meta-learning", arXiv:1905.05301v2 [cs.LG] Nov. 15, 2019, pp. 1-19.

Ba et al., "Predicting Deep Zero-Shot Convolutional Neural Networks using Textual Descriptions", arXiv:1506.00511v2 [cs.LG] Sep. 25, 2015, pp. 1-15.

Reed et al., "Learning Deep Representations of Fine-Grained Visual Descriptions", arXiv:1605.05395v1 [cs.CV] May 17, 2016, pp. 1-10.

* cited by examiner

SNR DETECTION WITH FEW-SHOT TRAINED MODELS

RELATED APPLICATION INFORMATION

This application claims priority to U.S. Patent Application No. 63/399,747, filed on Aug. 22, 2022, and to U.S. Patent Application No. 63/408,550, filed on Sep. 21, 2022, each incorporated herein by reference in its entirety.

BACKGROUND

Technical Field

The present invention relates to optical networking and, more particularly, to detection of signal-to-noise ratio (SNR) using machine learning.

Description of the Related Art

Optical networking encodes signals in light to transmit information in telecommunications networks. Such networks may include local area networks (LANs) or wide area networks (WANs), and may be distributed across metropolitan and regional areas as well as being used for long-distance national, international, and transoceanic networks. Optical networking makes use of optical amplifiers, lasers or light emitting diodes (LEDs), and wave division multiplexing (WDM) equipment to transmit large amounts of data across fiber-optic cables. Optical networking can provide high bandwidth and is upgradeable, as new endpoint equipment can generally make use of existing fiber-optic cables.

To ensure transmission quality in optical networks, signals may be monitored to identify the system status of optical transceivers. However, user equipment may differ from the environment that is used as a baseline, so that models used for SNR determination may not be applicable to a particular testing environment. Manual measurement of SNR in a given environment, meanwhile, is time-consuming and uses specialized equipment.

SUMMARY

A method for training a model includes determining class prototypes of time series samples from a training dataset. A task corresponding to the time series samples is encoded using the class prototypes and a task-level configuration. A likelihood value is determined based on outputs of a time series density model, a task-class distance from a task embedding model, and a task density model. Parameters of the time series density model, the task embedding model, and the task density model are adjusted responsive to the likelihood value.

A system for training a model includes a hardware processor and a memory that stores a computer program. When executed by the hardware processor, the computer program causes the hardware processor to determine class prototypes of time series samples from a training dataset, to encode a task corresponding to the time series samples using the class prototypes and a task-level configuration, to determine a likelihood value based on outputs of a time series density model, a task-class distance from a task embedding model, and a task density model, and to adjust parameters of the time series density model, the task embedding model, and the task density model responsive to the likelihood value.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Signal-to-noise ratio (SNR) in a given test environment may be measured using a trained machine learning model. However, because a training environment used to generate training data for the machine learning model may differ substantially from the test environment, such a limited model may give inaccurate results. The environments may have substantially different configurations, varying in terms of the network topology (e.g., ring topologies, star topologies, grid topologies, etc.), the number of nodes in the network, the quality and type of optical fiber, and so on.

Due to the large variety of different configurations, training data for any given configuration may be limited. Further, different configurations may represent different domains, with each domain having different domain-specific considerations. Testing data from previously unseen domains may be particularly challenging, and there may be configuration parameters that differ in ways that were not anticipated during training.

A meta-learning framework may be used to quickly adapt a trained model to a new data distribution. During training, a certain number of training sets may be generated under different respective conditions. A machine learning model may be trained by iterating over the training sets. At testing time, a relatively small number of labeled examples may be generated at the target environment and may be used to fine-tune the model. The fine-tuned model may then be used for future predictions in the target environment. The generation of a relatively small number of labeled examples in the target environment is more feasible than generating an entire training corpus that would be suitable for training the entire model.

Figure 1:
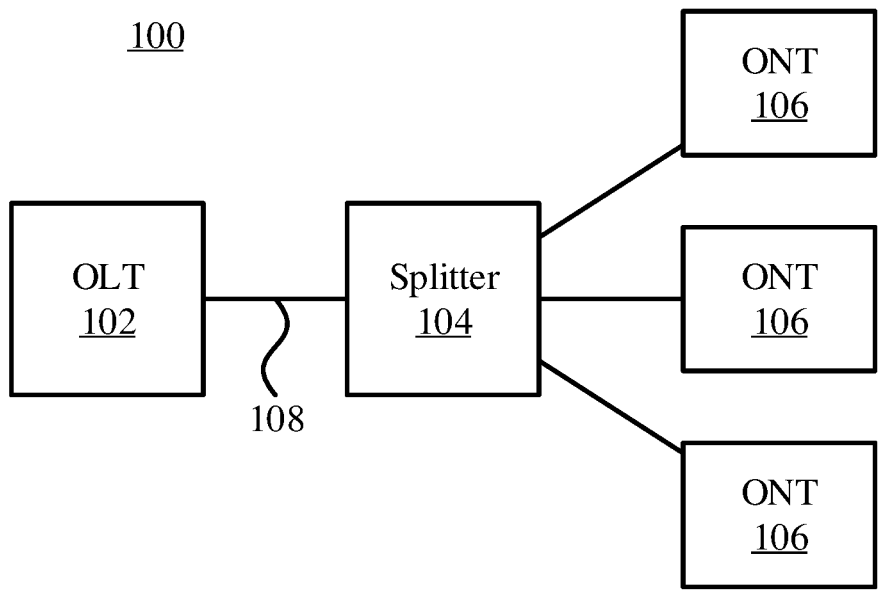
FIG. 1 is a diagram of an exemplary optical network, where properties of optical signals transmitted over the optical network depend on the configuration of the optical network, in accordance with an embodiment of the present invention.

Referring now to FIG. 1, an exemplary optical networking environment 100 is shown. The environment includes an optical line terminal (OLT) 102 and one or more optical network terminals (ONTs) 106. Fiber-optic cables 108 connect the devices to one another. A single cable 108 leaving the OLT 102 may carry multiple different optical signals, for example being combined on a single physical medium with wavelength division multiplexing (WDM). In some cases, multiple cables 108 may leave the OLT 102.

A cable 108 from the OLT 102 leads to an optical splitter 104. In some cases, the optical splitter may use wavelength-selective splitting to divide the combined optical signal from the OLT 102 into different signals having different respective wavelengths. In some cases the optical splitter may be insensitive to wavelength, in which case filtering may be performed at the ONTs 106 to remove unwanted wavelengths. The ONTs 106 receive optical signals from the splitter 104 by way of further fiber optic cables 108. The ONTs 106 convert the optical signals to electrical signals suitable for processing by downstream network hardware (not shown).

The signals may include a variety of different types of modulation and multiplexing. For example, in addition to WDM, polarization multiplexing may be used to transmit multiple signals on each wavelength with orthogonal optical polarizations. Information may be modulated onto the optical signals using any appropriate modulation scheme or schemes, such as phase modulation, frequency modulation, polarization modulation, amplitude modulation, spatial modulation, and diffraction modulation.

During the trip from the OLT 102 to the ONT 106, noise may accumulate in the transmitted signals from a variety of sources. These sources may include interference from, e.g., outside signals, inter-symbol interference, chromatic dispersion, polarization drift, imperfections in the transmission medium, and index of refraction mismatches. The ONTs 106 may include equalization hardware that compensates for errors that may accumulate during transmission over the fiber-optic cables 108. However, measurement of SNR remains a common measure of optical network performance and imposes limits on the amount of information that can be transmitted in the environment 100.

SNR information can be measured within the environment, for example by comparing measurements of signals at the OLT 102 and at the ONT 106. Such measurements may be performed manually, but are relatively time consuming. In contrast, measurements of received signal information at the ONT 106 may be used as input to a trained machine learning model. The model may be trained on a dataset that includes received signals labeled according to actual measured SNR values. The model may thereby be used to generate SNR values for the input received signal information without the need for manual measurement.

However, because the configuration of environment 100 may differ substantially from the configuration(s) of an experimental environment that was used to generate the training data, such a machine learning model may not produce correct outputs. Meta-learning may therefore be used to generate a machine learning model that can be fine-tuned for a target environment with a relatively small number of labeled examples.

The signals received by the ONTs 106 may be monitored and tracked to identify the system status. The signals may include data obtained after polarization decomposition and data obtained after digital signal processing (DSP). For example, a snapshot of such a signal may record twenty thousand complex numbers (e.g., ten thousand signals for each of the x and y polarizations). The snapshots may be collected at subsequent time steps to record a time series. In real analysis, this data is transformed to a multivariate time series by dividing the complex plane into 10×10 grids. The number of signals seen in each grid is counted, which continuously changes over time and hence contributes a dimension of the multivariate time series data. The total number of dimensions is the number of grids.

A machine learning model may be trained 204/206 on the multivariate time series data from an optical network. The trained model may be tuned to a particular environment, distinct from the experimental environment from which most of the training information was derived, to automatically infer the SNR of newly recorded time series information.

Figure 2:
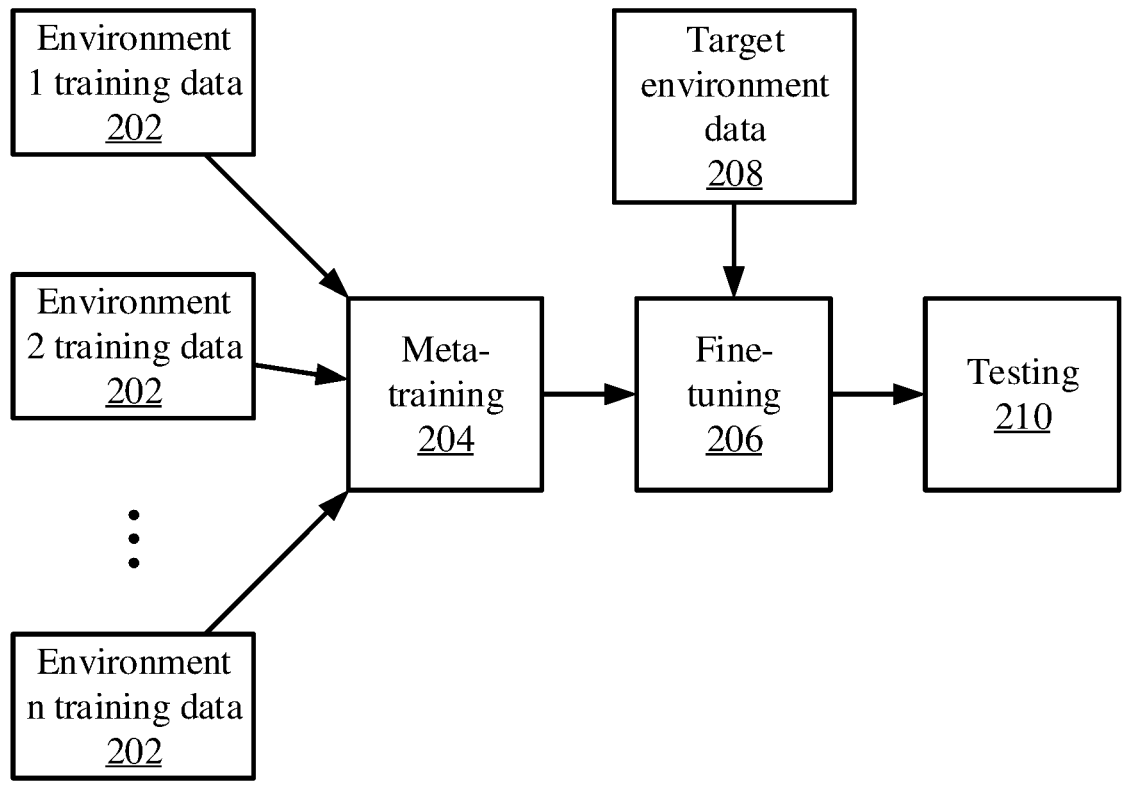
FIG. 2 is a block diagram of a system that trains a model for use in a target environment, distinct from an experimental environment, in accordance with an embodiment of the present invention.

Referring now to FIG. 2, a meta-learning approach to SNR measurement is shown. Training data is collected from n environments 202, each of which may have a different respective configuration for an optical network. The training data may include a set of multivariate time series measurements that track multiple data points over time. The time series may be associated with respective labels, indicating an SNR value. Any appropriate SNR measurement may be used. In one particular example, the SNR value may range from 0, indicating unacceptable SNR, to 35, indicating a very good SNR.

Training data 202 is used as input to a meta-training process 204, which trains an appropriate machine learning model. The training process may include a backpropagation process, whereby training examples are compared to predictions made by the model, and whereby discrepancies are used to adjust the parameters of the model. The meta-training 204 generates a trained baseline model.

Fine-tuning 206 is then performed using target environment data 208. The target environment data 208 may be measured by any appropriate means, such as by manual measurement of the target environment. A smaller number of labeled examples may be available in the target environment data 208 than in the training data 202. Fine-tuning 206 adapts the trained baseline model to a trained target model that is equipped to handle the target environment by generating new prototypes in a meta-testing support set, to help finish classification on the meta-testing's query set. In some embodiments, the fine-tuning 206 may not itself update parameters of the trained model. The fine-tuned model is then used in testing 210, where a new task is performed based on new inputs.

Each environment may be treated as a different task operating on a different distribution of features. Modeling a mixture of task distributions and detecting novel tasks are two aspects of the same problem, density estimation on task instances. The present model may therefore be implemented as a hierarchical Gaussian mixture based task generative model, which may be used to explicitly model the generative process of task instances. Task generation may be extended to a new process specified by a hierarchy of Gaussian mixture distributions. The model generates a task embedding from a task-level Gaussian mixture and uses it to define the task-conditioned mixture probabilities for a class-level Gaussian mixture, from which data samples are drawn. A Gibbs distribution may be used to underlie the class-level Gaussian mixture, to allow realistic classes per task.

The present model may be implemented as an encoder-agnostic framework that is flexible to different domains. A metric-based meta-learning method introduces a small overhead to an encoder for parameterizing its distributions and is therefore efficient for large backbone networks. The model parameters are learned end-to-end by maximum likelihood estimation.

Meta-learning may use an episodic learning strategy, where the meta-training set $\mathcal{D}^{tr}$ includes a batch of episodes. Each episode may sample a task $\tau$ from a distribution $p(\tau)$. Each task $\tau$ may have a support set $\mathcal{D}_\tau^s = \{(x_i^s, y_i^s)\}_{i=1}^{n_s}$ for training and a query set $\mathcal{D}_\tau^q = \{(x_i^q, y_i^q)\}_{i=1}^{n_s}$ for testing, where the number of samples in the support set $n_s$ is a relatively small number (e.g., between 10 and 20, though any number smaller than a number of training samples is contemplated) and where $n_q$ is the number of samples in the query set. The data values in each set are made up of a time series $x_i$ and an associated label $y_i$. In an N-way, K-shot Q-query task, the sets $\mathcal{D}_\tau^s$ and $\mathcal{D}_\tau^q$ include N classes, with K and Q samples per class respectively, such that $n_s=NK$ and $n_q=NQ$.

A base mode may be expressed as $f_\theta(x_i^*) \to y_i^*$, where * denotes s or q, and an adapted model may be expressed as $f_\theta(\bullet; \mathcal{D}_\tau^s)$. The training objective on r seeks to minimize the average test error of the adapted model:

$$\mathbb{E}_{(x_i^q, y_i^q) \in \mathcal{D}_\tau^q} \ell(y_i^q, f_\theta(x_i^q, \mathcal{D}_\tau^s))$$

where $\ell(\bullet; \bullet)$ is a loss function, such as the cross-entropy loss. The meta-training process aims to find the parameter $\theta$ that minimizes this error over all episodes in $\mathcal{D}^{tr}$. Then $f_\theta$ may be evaluated on every episode of a meta-test set D to that samples a task from the same distribution $p(\tau)$. This distribution may be generalized to a mixture distribution that has multiple components $p_1(\tau), \ldots, p_r(\tau)$, and a test episode may sample a task either in or out of any component of $p(\tau)$, where r is a hyper-parameter denoting the number of components of the mixture distribution. Given the training tasks in $\mathcal{D}^{tr}$, the underlying density of $p(\tau)$ may be estimated so that, once a test task is given, it can be determined whether the test task is a novel task and $f_\theta$ can be adapted with accuracy.

The base model $f_\theta$ may be written as a combination of an encoder $g_{\theta_e}$ and a predictor $h_{\theta_p}$, such as $f_\theta(x_i^*) = h_{\theta_p}(g_{\theta_e}(x_i^*))$. A metric-based non-parametric learner, such as with prototypical networks may be used, such that $\theta_p = \emptyset$. Metric-based classifiers are more effective than probabilistic classifiers for novelty detection and have better training efficiency for large backbone networks than nested-loop training of optimization-based methods.

A model parameter $\theta$ is determined that maximizes the likelihood of observing a task $\tau$. Thus the sample embedding may be $f_\theta(x_i^*) = e_i^* \in \mathbb{R}^d$, with the likelihood of the joint distribution $p_\theta(e_i^*, y_i^*)$ being maximized on the observed data in $\mathcal{D}_\tau = \{\mathcal{D}_\tau^s, \mathcal{D}_\tau^q\}$, and where d is a hyper-parameter denoting a number of dimensions of the task representation. Each task $\tau$ may be considered as an instance, with a representation $v_\tau \in \mathbb{R}^d$ in the embedding space. To model the unobserved mixture component, every task may be associated with a latent variable $z_\tau$ to indicate to which component it belongs.

With r possible components and a total number of samples $n = n_s + n_q$ in $\mathcal{D}_\tau$, the log-likelihood to maximize can be written by hierarchically factorizing on $y_i^*$ and marginalizing out $v_\tau$ and $z_\tau$:

$$\ell(\mathcal{D}_\tau; \theta) = \frac{1}{n}\sum_{i=1}^n \log\left[p_\theta(e_i^* \mid y_i^*)\left[\int_{v_\tau} p(y_i^* \mid v_\tau)\left[\sum_{z_\tau=1}^r p(v_\tau \mid z_\tau)p(z_\tau)\right]dv_\tau\right]\right]$$

where $p_\theta(e_i^* \mid y_i^*)$ specifies the probability of sampling the embedding $e_i^*$ from the class $y_i^*$, $p(y_i^* \mid v_\tau)$ is the probability of sampling the class $y_i^*$ for the task $\tau$, and $p(v_\tau \mid z_\tau)$ indicates the probability of generating a task $\tau$ from the mixture component $z_\tau$. Thus $p(z_\tau)$ is a prior on the component $z_\tau$, so that the task $\tau$ has a generative process $z_\tau \to v_\tau \to y_i^* \to e_i^*$.

The class-conditional distribution $p_\theta(e_i^* \mid y_i^*)$, the task-conditional distribution $p(y_i^* \mid v_\tau)$, and the mixture distribution of tasks defined by $\{p(v_\tau \mid z_\tau), p(z_\tau)\}$ are not specified. To make the loss function $\ell$ optimizable, the generative process of tasks is introduced. Because $\mathcal{D}_\tau^s$ and $\mathcal{D}_\tau^r$ follow the same distribution, the superscript * is ignored below for simplicity.

A Gaussian distribution may be used to model the embeddings $e_i$ in each class. The mean $\mu_{y_i}^c$ and the variance $\Sigma_{y_i}^c$ of the class $y_i$ produce $p_\theta(e_i \mid y_i) = \mathcal{N}(e_i \mid \mu_{y_i}^c, \Sigma_{y_i}^c)$. The samples in all of the classes of task $\tau$ make up a Gaussian mixture distribution, where $p(y_i)$ is the mixture probability of the class $y_i$. The term $p(y_i)$ may be factorized to be task specific, $p(y_i \mid v_\tau)$, which resorts to another mixture distribution $v_\tau$ of tasks and establishes a structure of hierarchical mixture.

However, the density function of the Gaussian distribution is log-concave with one global maximum. Given the mean and variance, maximizing its log-likelihood tends to collapse the prototypes $\mu_{y_i}^c$ of all classes in $\tau$, making them indistinguishable and impairing classification. Furthermore, given $v_\tau$, this tends to sample classes with small $D_{v_\tau}(\mu_{y_i}^c)$ where $D_{v_\tau}(\bullet)$ measures the Mahalanobis distance between a data point and the Gaussian distribution centered at $v_\tau$. However, classes are often uniformly sampled from a domain without any prior on distances. Fitting the distance function with such uniform classes naively leads to an ill-posed learning problem with degenerate solutions.

As a result, $p(y_i \mid v_\tau)$ may be defined as a parameterized density function with at least N global optima, so that it can distinguish the N different class prototypes of N-way tasks. The N equal optima also allow it to fit N classes uniformly sampled from a domain. To this end, $\mu_{y_i}^c$ may be the surrogate embedding of the $k^{th}$ class and a Gibbs distribution $\pi(\mu_{y_i}^c \mid v_\tau, \mathbf{w})$ may be defined by $v_\tau$ and trainable parameters $\mathbf{w}$ with an energy function. Thus:

$$p_\mathbf{w}(y_i = k \mid v_\tau) = \pi(\mu_k^c \mid v_\tau, \mathbf{w}) = \frac{e^{-E_\mathbf{w}(\mu_k^c; v_\tau)}}{\int_{\mu_k^c} e^{-E_\mathbf{w}(\mu_k^c; v_\tau)}}$$

where $$E_\mathbf{w}(\mu_k^c; v_\tau) = \min\left(\left\{\left\|\mu_k^c - W_j v_\tau\right\|_2^2\right\}_{j=1}^N\right)$$

is an energy function and the denominator is a normalizing constant with respect to $\mu_k^c$, a partition function in an energy-based model, and $\mathbf{w} = \{W_1, \ldots, W_N\}$ are trainable parameters, with $W_i \in \mathbb{R}^{d \times d}$. Given $\mathbf{w}$ and $v_\tau$, there are N global maximums at $\mu_k^c = W_1 v_\tau, \ldots, \mu_k^c = W_N v_\tau$.

The task distribution $p(v_\tau)$ is factorized as a mixture of $p(v_\tau|z_\tau=1), \ldots, p(v_\tau|z_\tau=r)$, weighted by their respective mixture probability $p(z_\tau)$. Thus $p(v_\tau)$ may be specified as a Gaussian mixture distribution, with mean $\mu_{z_\tau}^t$ and variance $\Sigma_{z_\tau}^t$ of each component, such that $p(v_\tau|z_\tau)=\mathcal{N}(v_\tau|\mu_{z_\tau}^t, \Sigma_{z_\tau}^t)$. The term $v_\tau$ may be generated in two steps: drawing a latent task variable $z_\tau$ from a categorical distribution on $[p(z_\tau=1), \ldots, p(z_\tau=r)]$, which can be Uniform(r), and drawing $v_\tau$ from $\mathcal{N}(\mu_{z_\tau}^t, \Sigma_{z_\tau}^t)$. The generative process of an N-way, K-shot, Q-query task $\tau$ can be summarized as:

1. Draw $z_\tau \sim$ Categorical($[p(z_\tau=1), p(z_\tau=r)]$)
2. Draw a task embedding $v_\tau \sim \mathcal{N}(\mu_{z_\tau}^t, \Sigma_{z_\tau}^t)$
3. For k=1, ..., N
   (a) Draw a class prototype $\mu_k^c \sim \pi(\mu_k^c|v_\tau, \mathcal{D})$ from Gibbs distribution
   (b) For i=1, ..., K+Q
      i. Set $y_i$=k
      ii. Draw $e_i \sim \mathcal{N}(e_i|\mu_{y_i}^c, \Sigma_{y_i}^c)$
      iii. If i≤K:
         (A) Allocate $(e_i, y_i)$ to support set $\mathcal{D}_\tau^s$
      iv. Else
         (A) Allocate $(e_i, y_i)$ to query set $\mathcal{D}_\tau^q$ To reduce complexity, an isotropic Gaussian with tied variance may be used for class distributions, where $\Sigma_1^c = \ldots = \Sigma_N^c = \sigma^2 I$, with I being the identity matrix and a being a hyperparameter. For task distributions, the variances can be automatically inferred.

Substituting $p_\theta(e_i|y_i)=\mathcal{N}(e_i|\mu_{y_i}^c, \sigma I)$, $p\mathcal{D}(\mu_{y_i}^c|v_\tau)=\pi(\Sigma_{y_i}^c|v_\tau, w)(y_i=k)$, $p(v_\tau|z_\tau)=\mathcal{N}(v_\tau|\mu_{z_\tau}^t, \Sigma_{z_\tau}^t)$, and $p(z_\tau)=$Uniform(r), whose probabilities are specified and parameterized, a loss function $\ell(\mathcal{D}_\tau; \theta, w)$ is determined. The class means $\mu_{y_i}^c$, task means $\mu_{z_\tau}^t$, and variances $\Sigma_{z_\tau}^t$ are inferred as described below.

Directly optimizing $\ell(\mathcal{D}_\tau; \theta, w)$ is challenging, because the exact posterior inference is intractable due to the integration over $v_\tau$. Variational methods may be used to solve it, introducing an approximated posterior $q_\phi(v_\tau|\mathcal{D}_\tau^s)$, which is defined by an inference network $\phi$ and implies that $v_\tau$ may be inferred from its observed support step $\mathcal{D}_\tau^s$. The query set $\mathcal{D}_\tau^q$ is not included because it is not available during model testing. A lower bound may be expressed as:

$$\ell_L(\mathcal{D}_\tau; \theta, w) = \frac{1}{N}\sum_{i=1}^n \left( \log p_{\theta, w}(e_i|y_i) + \mathbb{E}_{v_\tau \sim q_\phi(v_\tau|\mathcal{D}_\tau^s)}\left[\log p_w(y_i|v_\tau) + \log \sum_{z_\tau=1}^\gamma p(v_\tau|z_\tau)p(z_\tau)\right] \right) + H(q_\phi(v_\tau|\mathcal{D}_\tau^s))$$

where $H(q_\phi(v_\tau|\mathcal{D}_\tau^s))=-\int_{v_\tau} q_\phi(v_\tau|\mathcal{D}_\tau^s) \log q_\phi(v_\tau|\mathcal{D}_\tau^s) dv_\tau$ is the entropy function. This formulation estimates the expectation $\mathbb{E}$ by sampling $v_\tau$ from $q_\phi(v_\tau|\mathcal{D}_\tau^s)$ instead of the integration to facilitate computation.

The function $q_\phi(v_\tau|\mathcal{D}_\tau^s)$ may be defined as a Gaussian distribution $\mathcal{N}(\mu_{z_\tau}^a, \bar{\sigma}^2 I)$, where $\mu_{z_\tau}^a$ is the output of the inference network that approximates it $\mu_{z_\tau}^t$ and $\bar{\sigma}$ is a hyperparameter for the corresponding variance. The inference network may be built on a base model $f_\theta(\bullet)$ with two non-parametric aggregation functions, thus $\phi=\theta$. The first function aggregates class-wise embeddings to prototypes $\mu_{y_i}^c$. The second aggregates prototypes to $\mu_{z_\tau}^a$. During model training, reparameterization may be used to sample $v_\tau$ from $\mathcal{N}(\mu_{z_\tau}^a, \bar{\sigma}^2 I)$. Meanwhile $H(q_\phi(v_\tau|\mathcal{D}_\tau^s))$ becomes a constant due to $\bar{\sigma}^2$ being a constant.

In some cases, different class means $\mu_1^c, \ldots, \mu_N^c$ in a task $\tau$ may collide, drawing all sample embeddings to the same spot. To avoid trivial solutions and to improve the stability of optimization, negative sampling may be used:

$$\ell_{neg}(\mathcal{D}_\tau; y_i, \theta, w) = -\log \mathbb{E}_{e_j \sim \mathcal{D}_\tau}\left[e^{-\frac{\|e_j - \mu_{y_i}^c\|_2^2}{2\sigma^{2d}}}\right]$$

where $e_j$ is a negative sample embedding from any class in the support set and where $\mu_{y_i}^c$ is the mean of the positive class. It is beneficial to integrate $\ell$ with the likelihood loss function during training:

$$\ell_L(\mathcal{D}_\tau; \theta, w) + \frac{1}{n}\sum_{i=1}^n \ell_{neg}(\mathcal{D}_\tau; y_i, \theta, w)$$

This not only serves as a robust training lost, but also helps to solve challenges relating to the partition function.

In particular, the term $p\mathcal{D}(y_i|v_\tau)$ involves computing a partition function, which may be intractable due to the integration over all possible $\mu_k^c$. An upper bound may be imposed on the partition function:

$$\int_{\mu_k^c} e^{-E_k(\mu_k^c; v_\tau)} d\mu_k^c \leq N\sqrt{2^{d-1}\pi^d}$$

a constant value with a specific N. This upper bound shows the partition function approximates $N\sqrt{2^{d-1}\pi^d}$ when all pairs of the global maximums are far apart. By replacing he partition function with $N\sqrt{2^{d-1}\pi^d}$, a lower bound for $p\mathcal{D}(y_i|v_\tau)$ is obtained, relaxing the lower bound of $\ell_L$.

The tightness of the relaxed bound is controllable. Among the N global maxima $W_1 v_\tau, \ldots, W_N v_\tau$, the terms $W_h v_\tau$ and $W_l v_\tau$ are the terms with the smallest Euclidean distance $D_{hl}$, where $1 \leq h$ and $l \leq N$. Thus:

$$\lim_{D_{hl} \to \infty} \int_{\mu_k} e^{-E_{\nu r}(\mu_k^c; v_\tau)} d\mu_k^c = N\sqrt{2^{d-1}\pi^d}$$

The partition function therefore approximates $N\sqrt{2^{d-1}\pi^d}$ when all pairs of the global maxima are far apart. When maximizing the likelihood, $W_1 v_\tau, \ldots, W_N v_\tau$ is fit to different class prototypes $\mu_1^c, \ldots, \mu_N^c$ in N-way tasks. Because $\ell_{eg}$ tends to maximize the distances between different prototypes through negative samples, maximizing the joint loss tends to separate $W_1 v_\tau, \ldots, W_N v_\tau$, thus tightening the relaxed bound after using $N\sqrt{2^{d-1}\pi^d}$.

The mixture distribution $p(z_\tau)$ is estimated in the third term of $\ell_L$. Similar to optimizing Gaussian mixture models, $p(z_\tau)$ may be inferred and the model parameters $\{\theta, w\}$ may be solved through an expectation-minimization process. In an expectation step, $p(z_\tau)$ may be inferred when fixing model parameters. In a maximization step, $\{\theta, w\}$ may be solved by fixing $p(z_\tau)$ and optimizing the combined loss with stochastic gradient descent.

In fine-tuning 206, the model may be adapted to new environmental information. Given a new N-way task $\tau'$ from the meta-test set $\mathcal{D}^{te}$, the corresponding support set $\mathcal{D}_\tau^s$, is fed into the network to generate class prototypes $\mu_1^c, \ldots, \mu_N^c$ and distribution $q_\phi(v_\tau|\mathcal{D}_\tau^s)$, from which average task embedding $v_{\tau'}=\mu_{z_{\tau'}}^a$ may be drawn. The inference network is the base model $f_\theta(\cdot)$ with class-pooling and task-pooling layers, and $\phi=\theta$.

The task embedding $v_{\tau'}$ is projected to $W_1 v_{\tau'}, \ldots, W_N v_{\tau'}$, which represent the N optimal choices of class prototypes for task $\tau'$ as learned by the Gibbs distribution from training the tasks. They are used to adapt $\mu_1^c, \ldots \mu_N^c$ so that the adapted prototypes are drawn toward the closest classes from the mixture component that task $\tau'$ belongs to. The adaptation is performed by selecting the closest optimum for each prototype:

$$\bar{\mu}_j^c = \alpha \mu_j^c + (1-\alpha) W_{l*} v_{\tau'}$$

where $l^* = \arg\min_{1 \leq l \leq N} D(\mu_j^c, W_l v_{\tau'})$ using Euclidean distance $D(\cdot, \cdot)$ and hyperparameter $\alpha$. It is determined whether $\tau'$ is a novelty by computing the likelihood of $v_{\tau'}$ in a pre-fitted Gaussian mixture model (GMM) on the embeddings $v_{\tau'}$ of the training tasks in $\mathcal{D}^{tr}$ and classification is performed on each sample $x_s'$ in the query set $\mathcal{D}_{\tau'}^q$ using adapted prototypes by:

$$p(y_i' = j' \mid x_i') = \frac{e^{-D(f_\theta(x_i'), \bar{\mu}_{j'}^c)}}{\sum_{j=1}^N e^{-D(f_\theta(x_i'), \bar{\mu}_j^c)}}$$

Figure 3:
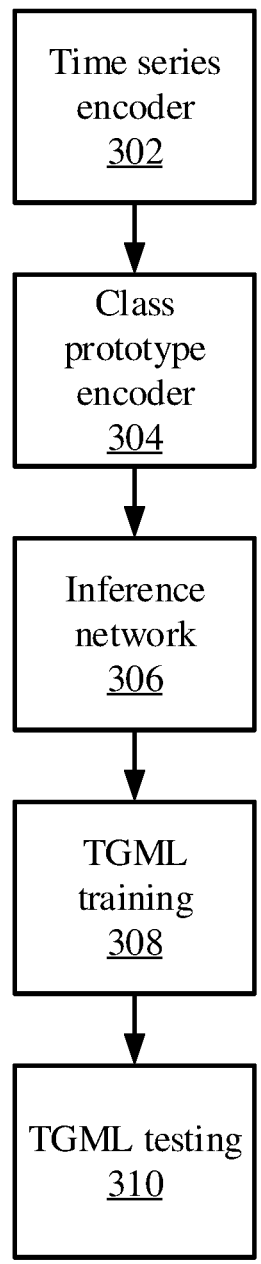
FIG. 3 is a block/flow diagram of a method of training a model, in accordance with an embodiment of the present invention.

Referring now to FIG. 3, detail on a task-generation meta-learning (TGML) model 300 is shown. The TGML model 300 allows heterogeneous data distributions of different tasks in the experimental environment, so that different tasks can have different data distributions. The TGML model 300 further incorporates the configuration values of the environmental or user conditions as a task-level meta-feature for improving task representation learning. Models can be quickly adapted to a new task, with automatic detection of out-of-distribution tasks, which can serve as an indication of whether to trust the results from the data. While the TGML model 300 is described herein as pertaining specifically to processing signal data from optical communications networks, it should be understood that the present principles may be applied to other types of data, such as images, text, video, etc., with an appropriate choice of data encoder.

A time series encoder 302 accepts signal data from a task and transforms samples of the multivariate time series data to a dense vector representation, for example using a long-short term memory (LSTM) neural network:

$$e = \text{LSTM}([x_1, \ldots, x_T])$$

where $x_1, \ldots x_T$ represent the T measurements within the sample.

A class prototype encoder 304 learns a prototype vector that represents each class in the task. The input data may include $\{(e_1, y_1), \ldots, (e_n, y_n)\}$, where $y_i$ is the label of the $i^{th}$ sample having a value within $[1, \ldots, N]$ for an N-way classification. The class prototype encoder computes a prototype vector $c_j$ for each class j, with values $1 \leq j \leq N$:

$$c_j = \frac{1}{n_k} \sum_{[(v_i, y_i)]_{y_i = j}} MLP(e_i)$$

where $MLP(\cdot)$ represents a multilayer perceptron (MLP) neural network. This summation obtains the averaged embedding of all the embeddings of instances in the same category j.

An inference network 306 learns a task embedding by integrating the information in task-level features and time series samples and then labels the task. As described in greater detail below, the inference network 306 includes a task-level feature encoder that encodes configuration data for the environment, a task instance encoder that aggregates class prototypes learned by the class prototype encoder 304, and a task embedder that aggregates the representations from the task-level feature encoder and the task instance encoder.

TGML training 308 performs a maximum likelihood. As will be described in greater detail below, the TGML training 308 optimizes model parameters of the encoding networks of the time series encoder 302, the class prototype encoder 304, and the inference network 306 and a set of distribution parameters $\{\mu_z\}$.

TGML testing 310 tests the trained model on new tasks. A class prototype adapter takes an average of support set samples of each class with its closest class prototype from the training set as the adapted prototype of the support set class. Using the adapted class prototypes, new time series samples in a query set can be classified using a distance based classifier.

Figure 4:
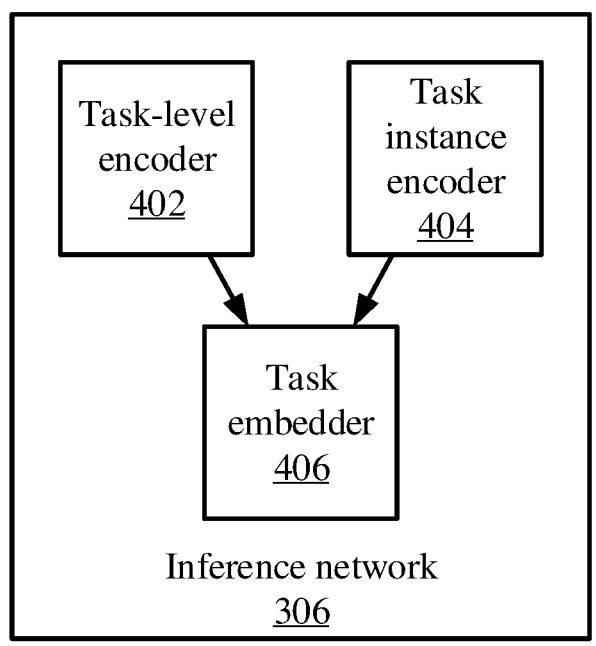
FIG. 4 is a block diagram of an exemplary inference network, in accordance with an embodiment of the present invention.

Referring now to FIG. 4, additional detail is shown in the inference network 306. A task-level feature encoder 402 may use an MLP neural network to encode configuration data from the environmental setup of the optical network. The configuration data may encapsulate useful information regarding the relationships between different tasks. Although an MLP encoder is specifically contemplated for the task-level features, it should be understood that any other appropriate encoder structure may be used instead, such as a text encoder for encoding textual configuration information.

A task instance encoder 404 aggregates the class prototypes learned by the class prototype encoder 304, which encodes the information of the time series data and labels in the task. The aggregation may be performed as:

$$v = \frac{1}{N} \sum_{j=1}^N MLP(c_j)$$

The task embedder 406 aggregates the representations from the task-level feature encoder 402 and the task instance encoder 404 by, e.g., concatenating the two vector representations and feeding them to an MLP.

Figure 5:
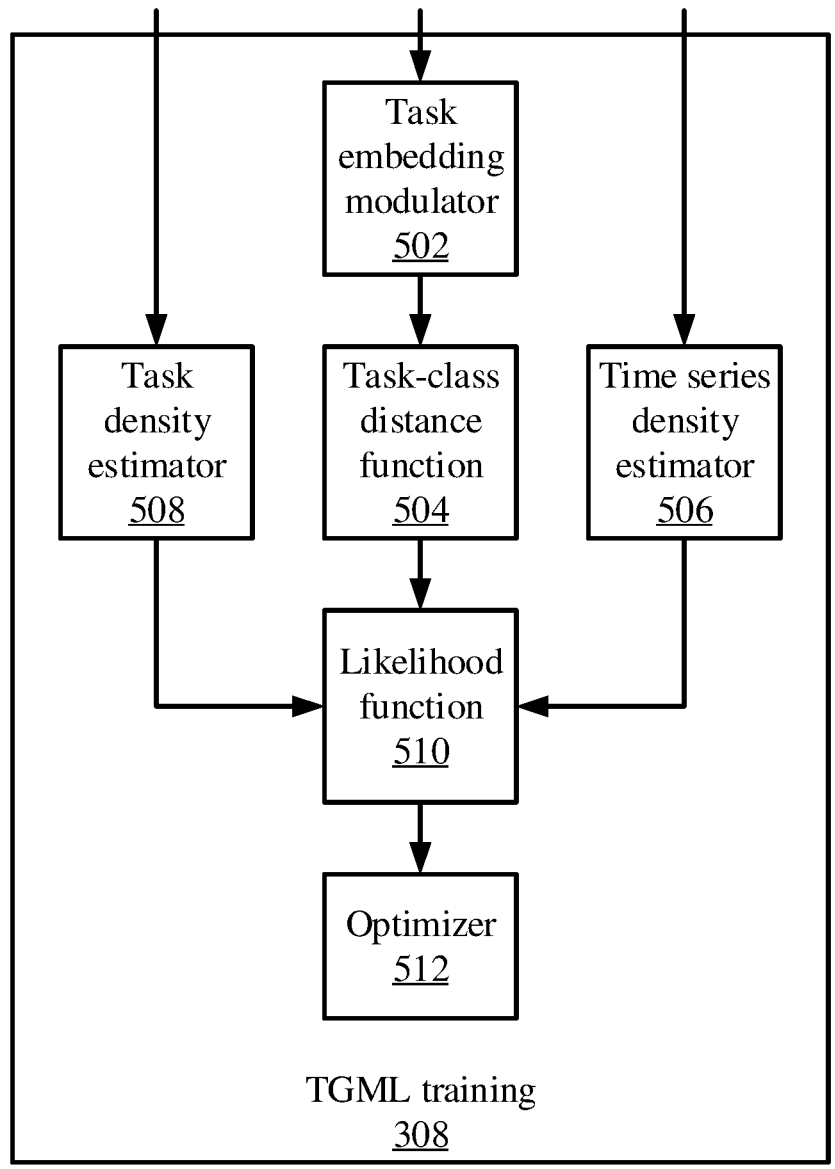
FIG. 5 is a block diagram of a system that trains a model, in accordance with an embodiment of the present invention.

Referring now to FIG. 5, additional detail is shown in the TGML training 308. A task embedding modulator 502 adjusts the task embedding v by projecting it to different areas by multiplying respective modulating vectors $[W_1, \ldots, W_N]$ as discussed above to generate $[W_1 v, \ldots, W_N v]$. This addresses the tendency of the generative process to generate classes that are similar to one another. A task-class distance function 504 avoids a trivial solution where tasks are sampled randomly and fitted to a model that locates the task embeddings at the center of a task cluster, whereas class means are on the hypersphere of the Gaussian distribution and have equal distance to a task embedding. The distance function may be expressed as:

$$D(\mu_y, v) = \max(\{\mu_y - W_i v\}_{i=1}^N)$$

which has global minima and helps alleviate the problem because the randomly sampled classes tend to fit different global minima. The term $\mu_y$ denotes class prototypes of class y. This allows the model to fit randomly sampled classes.

A time series density estimator 506 determines the probability of time series samples p(e|y) using their embeddings, given their class labels. Gaussian mixtures are used for time series samples, so the probability is:

$$P(e|y) = p_N(e|\mu_y, \Sigma_y)$$

where $p_N(\cdot)$ represents the density function of the Gaussian distribution, $\mu_y$ is the class prototype of the class represented by y (as output by class prototype encoder 304), and $\Sigma_y$ is the covariance matrix.

A task density estimator 508 computes the probability of a task p(v|y) using the embeddings from the task embedder 406. Again using the Gaussian mixture for the task embeddings, the probability is computed as:

$$p(v|y) = p_N(v|\mu_z, \Sigma_z)$$

where $\mu_z$ is the cluster center of the cluster represented by z, which are model parameters, and $\Sigma_z$ is the covariance matrix. If the density of a testing task is below a predetermined threshold, it may be identified as an out-of-distribution task. An out-of-distribution task may be reported to an administrator, though classification may still be performed with reduced confidence.

Using the outputs of the task-class distance function 504, the time series density estimator 506, and the task density estimator 508, the likelihood function 510 of the generative model may be expressed as:

$$\log(p(x, y)) = \log\left(p(x|y) \int_v p(y|v) p(v) dv\right) \geq$$
$$\log p(x|y) + \mathbb{E}_{q(v|f_{task}, x_{sup}, y)}[\log p(y|v)] + \mathbb{E}_{q(v|f_{task}, x_{sup}, y), q(z|v)}[\log p(v|z)] -$$
$$\mathbb{E}_{q(v|y)}[KL(q(z|v) \| p(z))] - H(q(v|f_{task}, x_{sup}, y))$$

which is a lower bound of the likelihood of the observed samples and labels p(x, y) in a task. The lower bound $\ell_L(\mathcal{D}_\tau; \theta, w)$, described above, may be used instead. An optimizer 512 optimizes the model parameters in the encoding networks and the distribution-related parameters $\{\mu_z\}$. Any appropriate optimization, such as an Adam optimizer, may be used.

Figure 6:
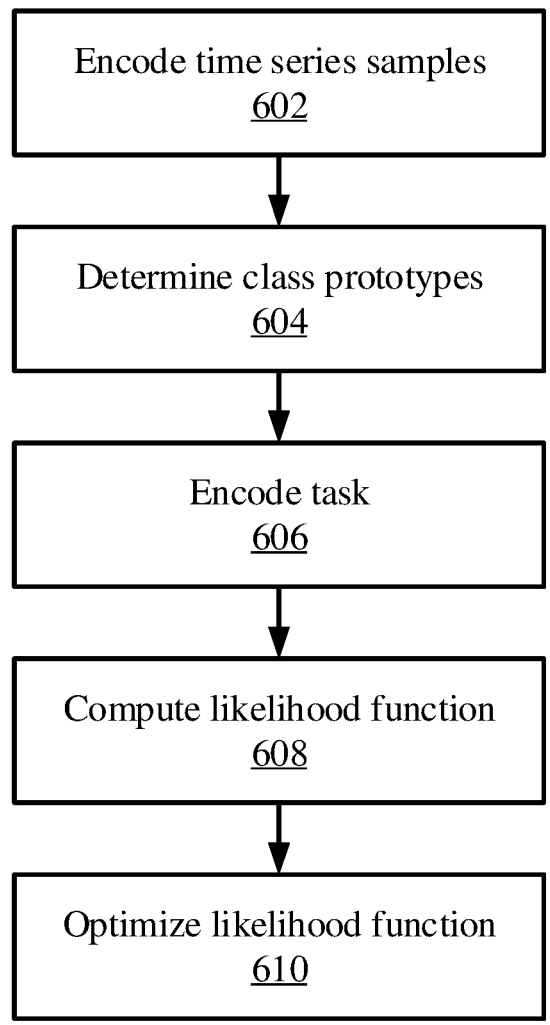
FIG. 6 is a block/flow diagram of a method of training a model, in accordance with an embodiment of the present invention.

Referring now to FIG. 6, a method of training a TGML model is shown. The training starts with training tasks $\mathcal{D}_{train}$, with each task having time series samples and labels. A task-level configuration file is further provided. Time series samples are encoded 602 and class prototypes are determined 604. Block 606 encodes the task. As noted above, block 608 computes a likelihood function, which block 610 optimizes according to the loss function described above.

Figure 7:
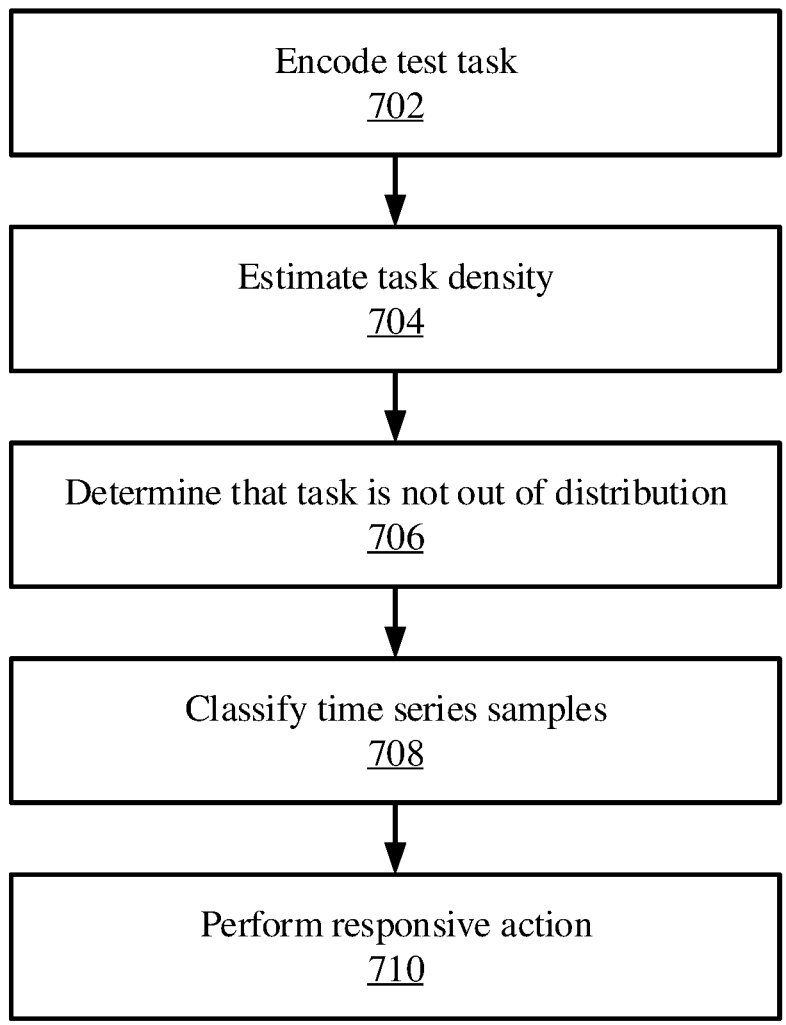
FIG. 7 is a block/flow diagram of a method of classifying time series data, in accordance with an embodiment of the present invention.

Referring now to FIG. 7, a method of classifying the behavior of a new system is shown. Block 702 encodes the test task. In the context of an optical network, this may include taking multivariate time series measurements of received signals, after polarization decomposition and after DSP, and encoding the time series as described above.

Block 704 estimates the task density. Using this density information, block 706 determines that the block is not out of distribution. This indicates that the state of the system is within the range that the trained model can handle. Block 708 then uses the model to classify the time series samples, for example to generate SNR information relating to the optical communications network.

Based on the outcome of the classification, a responsive action may be automatically performed 710 to improve the SNR or data rate. For example, if the SNR is low (e.g., below a threshold value that corresponds to accurate decoding of the signals), parameters of the signal may be altered to improve the SNR. If the SNR is high (e.g., above a threshold value that indicates the signal can be easily decoded), the parameters of the signal may be altered to improve the data rate. This adjustment may include changing modulation or encoding parameters of the signal and/or may include changing physical parameters of the optical network, such as altering environmental conditions of the optical networking equipment and correcting any malfunctions in the equipment itself.

Figure 8:
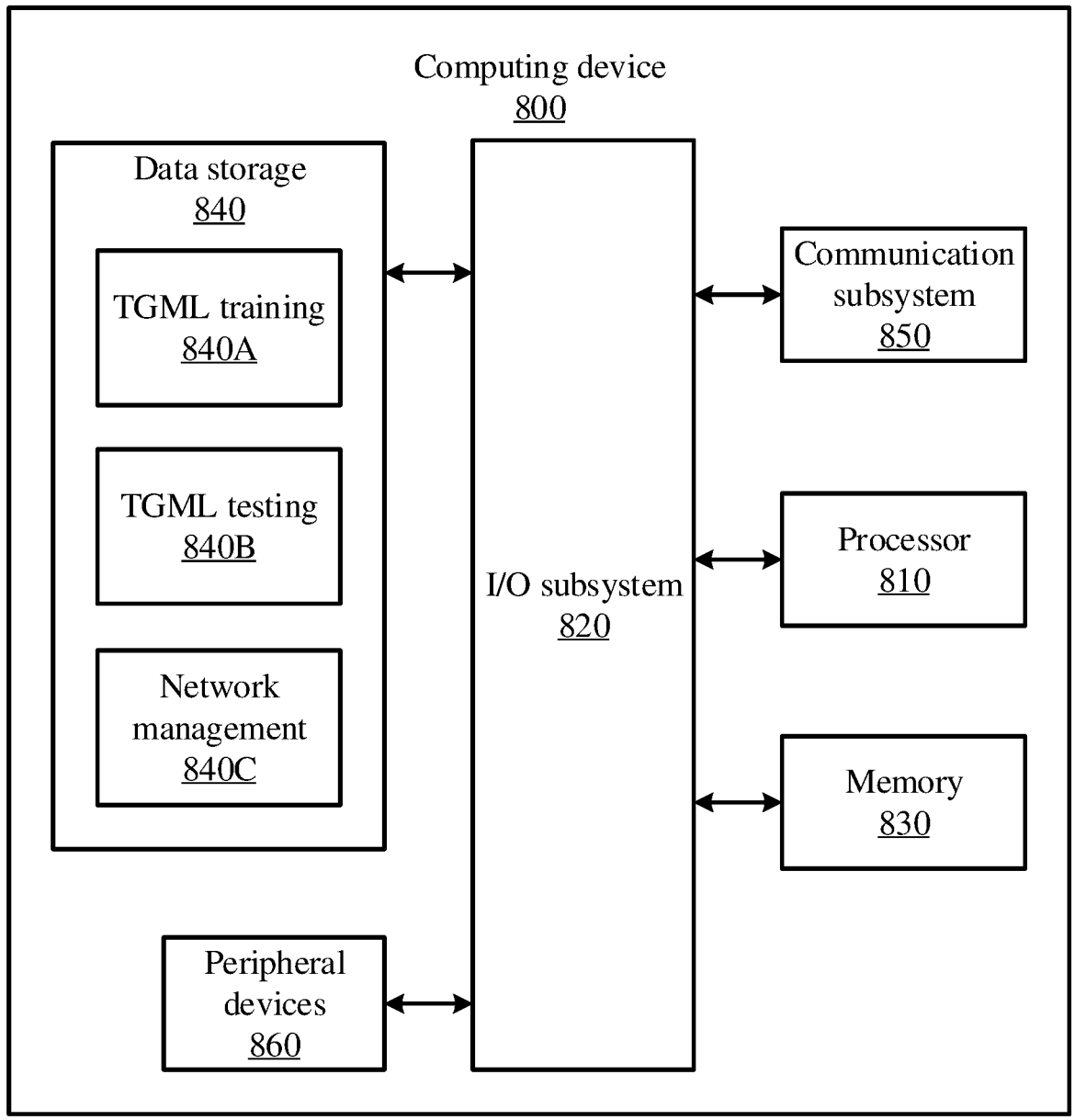
FIG. 8 is a block diagram of a computing system that can train and use a model and that can perform network management, in accordance with an embodiment of the present invention.

Referring now to FIG. 8, an exemplary computing device 800 is shown, in accordance with an embodiment of the present invention. The computing device 800 is configured to perform model training and network management.

The computing device 800 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 800 may be embodied as one or more compute sleds, memory sleds, or other racks, sleds, computing chassis, or other components of a physically disaggregated computing device.

As shown in FIG. 8, the computing device 800 illustratively includes the processor 810, an input/output subsystem 820, a memory 830, a data storage device 840, and a communication subsystem 850, and/or other components and devices commonly found in a server or similar computing device. The computing device 800 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 830, or portions thereof, may be incorporated in the processor 810 in some embodiments.

The processor 810 may be embodied as any type of processor capable of performing the functions described herein. The processor 810 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 830 may be embodied as any type of volatile or non-volatile memory or data storage capable of performing the functions described herein. In operation, the memory 830 may store various data and software used during operation of the computing device 800, such as operating systems, applications, programs, libraries, and drivers. The memory 830 is communicatively coupled to the processor 810 via the I/O subsystem 820, which may be embodied as circuitry and/or components to facilitate input/output operations with the processor 810, the memory 830, and other components of the computing device 800. For example, the I/O subsystem 820 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.), and/or other components and subsystems to facilitate the input/output operations. In some embodiments, the I/O subsystem 820 may form a portion of a system-on-a-chip (SOC) and be incorporated, along with the processor 810, the memory 830, and other components of the computing device 800, on a single integrated circuit chip.

The data storage device 840 may be embodied as any type of device or devices configured for short-term or long-term storage of data such as, for example, memory devices and circuits, memory cards, hard disk drives, solid state drives, or other data storage devices. The data storage device 840 can store program code 840A for performing training of the TGML model, 840B for testing a network's conditions with the TGML model, and/or 840C for network management. Any or all of these program code blocks may be included in a given computing system. The communication subsystem 850 of the computing device 800 may be embodied as any network interface controller or other communication circuit, device, or collection thereof, capable of enabling communications between the computing device 800 and other remote devices over a network. The communication subsystem 850 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 800 may also include one or more peripheral devices 860. The peripheral devices 860 may include any number of additional input/output devices, interface devices, and/or other peripheral devices. For example, in some embodiments, the peripheral devices 860 may include a display, touch screen, graphics circuitry, keyboard, mouse, speaker system, microphone, network interface, and/or other input/output devices, interface devices, and/or peripheral devices.

Of course, the computing device 800 may also include other elements (not shown), as readily contemplated by one of skill in the art, as well as omit certain elements. For example, various other sensors, input devices, and/or output devices can be included in computing device 800, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 800 are readily contemplated by one of ordinary skill in the art given the teachings of the present invention provided herein.

Figure 9:
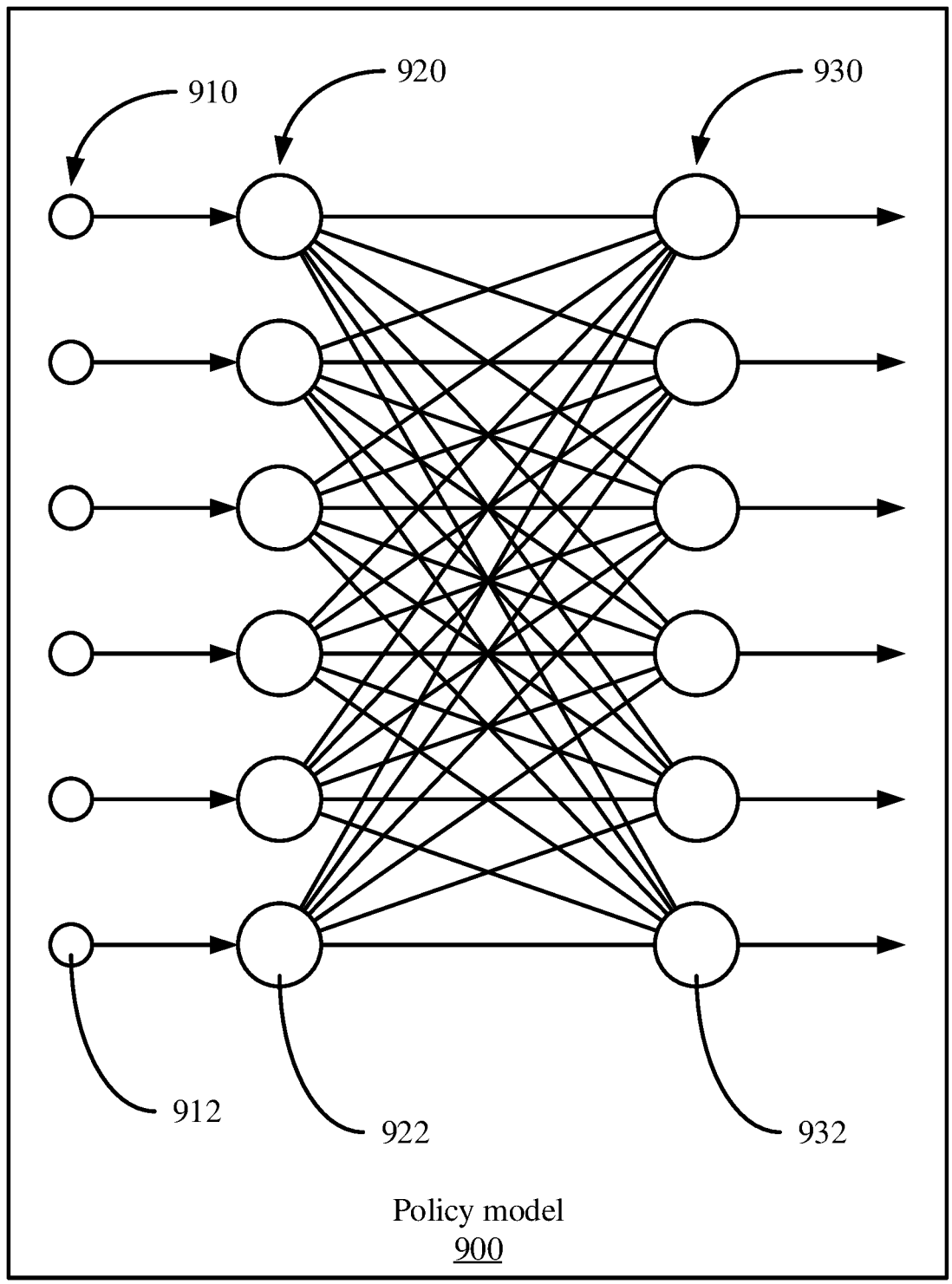
FIG. 9 is an exemplary neural network architecture that can be used in a policy model, in accordance with an embodiment of the present invention.
Figure 10:
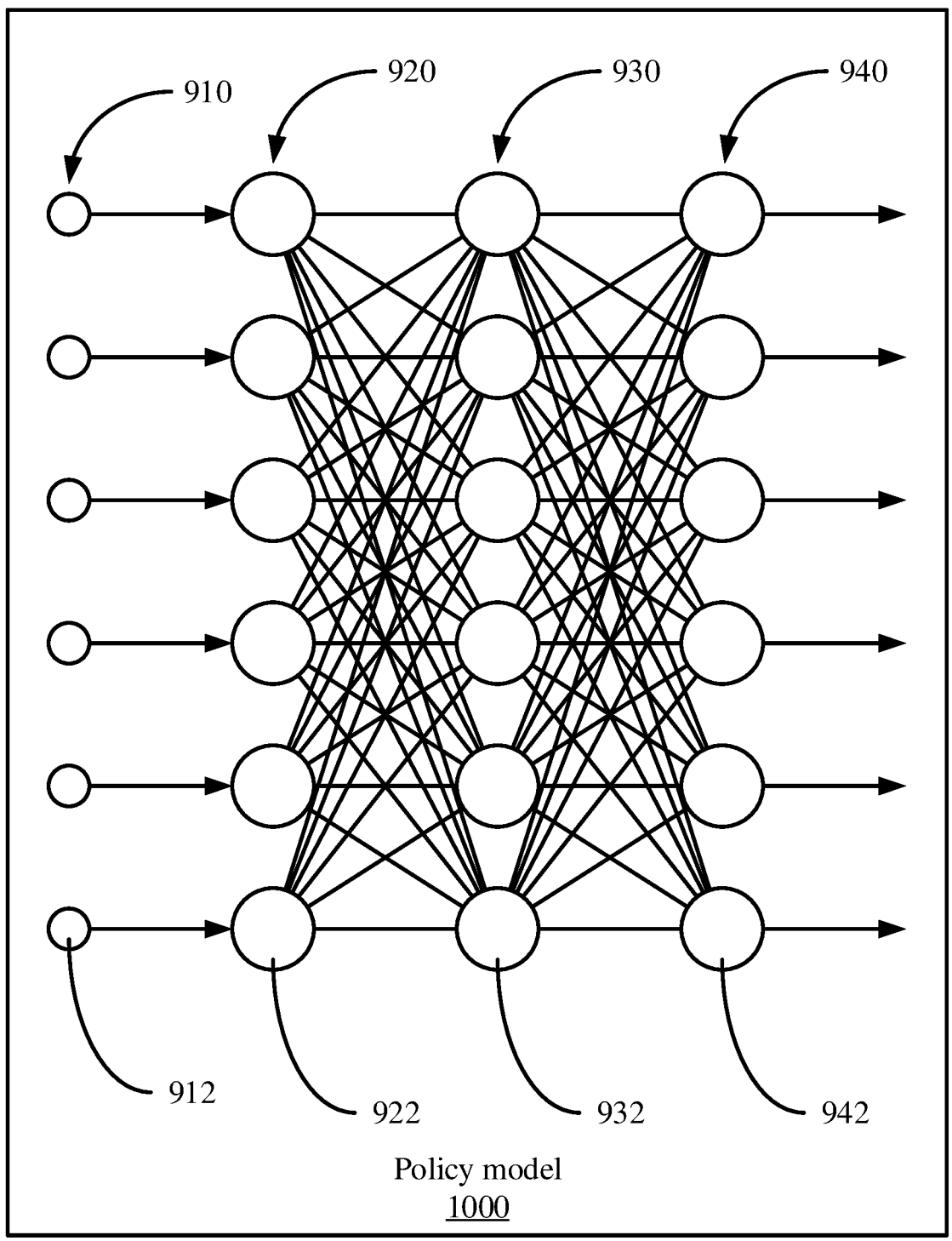
FIG. 10 is an exemplary deep neural network architecture that can be used in a policy model, in accordance with an embodiment of the present invention.

Referring now to FIGS. 9 and 10, exemplary neural network architectures are shown, which may be used to implement parts of the present models. A neural network is a generalized system that improves its functioning and accuracy through exposure to additional empirical data. The neural network becomes trained by exposure to the empirical data. During training, the neural network stores and adjusts a plurality of weights that are applied to the incoming empirical data. By applying the adjusted weights to the data, the data can be identified as belonging to a particular predefined class from a set of classes or a probability that the inputted data belongs to each of the classes can be outputted.

The empirical data, also known as training data, from a set of examples can be formatted as a string of values and fed into the input of the neural network. Each example may be associated with a known result or output. Each example can be represented as a pair, (x, y), where x represents the input data and y represents the known output. The input data may include a variety of different data types, and may include multiple distinct values. The network can have one input node for each value making up the example's input data, and a separate weight can be applied to each input value. The input data can, for example, be formatted as a vector, an array, or a string depending on the architecture of the neural network being constructed and trained.

The neural network "learns" by comparing the neural network output generated from the input data to the known values of the examples, and adjusting the stored weights to minimize the differences between the output values and the known values. The adjustments may be made to the stored weights through back propagation, where the effect of the weights on the output values may be determined by calculating the mathematical gradient and adjusting the weights in a manner that shifts the output towards a minimum difference. This optimization, referred to as a gradient descent approach, is a non-limiting example of how training may be performed. A subset of examples with known values that were not used for training can be used to test and validate the accuracy of the neural network.

During operation, the trained neural network can be used on new data that was not previously used in training or validation through generalization. The adjusted weights of the neural network can be applied to the new data, where the weights estimate a function developed from the training examples. The parameters of the estimated function which are captured by the weights are based on statistical inference.

In layered neural networks, nodes are arranged in the form of layers. An exemplary simple neural network has an input layer 920 of source nodes 922, and a single computation layer 930 having one or more computation nodes 932 that also act as output nodes, where there is a single computation node 932 for each possible category into which the input example could be classified. An input layer 920 can have a number of source nodes 922 equal to the number of data values 912 in the input data 910. The data values 912 in the input data 910 can be represented as a column vector. Each computation node 932 in the computation layer 930 generates a linear combination of weighted values from the input data 910 fed into input nodes 920, and applies a non-linear activation function that is differentiable to the sum. The exemplary simple neural network can perform classification on linearly separable examples (e.g., patterns).

A deep neural network, such as a multilayer perceptron, can have an input layer 920 of source nodes 922, one or more computation layer(s) 930 having one or more computation nodes 932, and an output layer 940, where there is a single output node 942 for each possible category into which the input example could be classified. An input layer 920 can have a number of source nodes 922 equal to the number of data values 912 in the input data 910. The computation nodes 932 in the computation layer(s) 930 can also be referred to as hidden layers, because they are between the source nodes 922 and output node(s) 942 and are not directly observed. Each node 932, 942 in a computation layer generates a linear combination of weighted values from the values output from the nodes in a previous layer, and applies a non-linear activation function that is differentiable over the range of the linear combination. The weights applied to the value from each previous node can be denoted, for example, by $w_1, w_2, \ldots w_{n-1}, w_n$. The output layer provides the overall response of the network to the input data. A deep neural network can be fully connected, where each node in a computational layer is connected to all other nodes in the previous layer, or may have other configurations of connections between layers. If links between nodes are missing, the network is referred to as partially connected.

Training a deep neural network can involve two phases, a forward phase where the weights of each node are fixed and the input propagates through the network, and a backwards phase where an error value is propagated backwards through the network and weight values are updated.

The computation nodes 932 in the one or more computation (hidden) layer(s) 930 perform a nonlinear transformation on the input data 912 that generates a feature space. The classes or categories may be more easily separated in the feature space than in the original data space.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for training a model, comprising:
   determining class prototypes of time series samples from a training dataset;
   encoding a task corresponding to the time series samples, having a measurement of an optical communications signal that includes one or more of data obtained after polarization decomposition and data obtained after digital signal processing, using the class prototypes and a task-level configuration that includes configuration parameters relating to an environment of an optical communications network;
   determining a likelihood value based on outputs of a time series density model, a task-class distance from a task embedding model, and a task density model; and
   adjusting parameters of the time series density model, the task embedding model, and the task density model responsive to the likelihood value.

2. The method of claim 1, further comprising encoding the time series samples into a vector representation before determining the class prototypes.

3. The method of claim 1, wherein encoding the task includes encoding task level features that include the task-level configuration and encoding task instance features by aggregating the class prototype.

4. The method of claim 1, wherein the task density model determines a task density as a probability of a task given a cluster center and a covariance matrix of a cluster.

5. The method of claim 1, wherein the time series density model determines a time series density as a probability of a time series sample based on a class prototype and a covariance matrix of a class.

6. The method of claim 1, wherein the task-class distance is determined as a maximum of a distance between a prototype and a set of optimal class prototypes.

7. The method of claim 1, wherein the likelihood value has a lower bound:

$$\ell_L(D_\tau; \theta, w) = \frac{1}{N}\sum_{i=1}^{n}\left(\log p_{\theta,w}(e_i \mid y_i) + \mathbb{E}_{v_\tau \sim q_\phi(v_\tau \mid \mathcal{D}_\tau^s)}\left[\log p_w(y_i \mid v_\tau) + \log \sum_{z_\tau=1}^{r} p(v_\tau \mid z_\tau)p(z_\tau)\right]\right) + H(q_\phi(v_\tau \mid \mathcal{D}_\tau^s))$$

where H(•) is an entropy function, N is a number of classes, $p_{\theta,w}(e_i|y_i)$ is a probability of an embedding $e_i$ given a sample $y_i$ with model parameter θ and trainable parameters w, $\mathbb{E}$ is an expectation function, $v_\tau$ is an embedded representation of task τ, $D_\tau^s$ is a set of training support samples, $q_\phi(•)$ is an approximated posterior with inference network ϕ, $z_\tau$ is a latent task variable, and r is a hyperparameter of a number of components in a mixture distribution.

8. The method of claim 1, further comprising determining a new task-level configuration that reflects configuration parameters relating to a new environment, to adapt to the new environment.

9. A system for training a model, comprising:
   a hardware processor; and
   a memory that stores a computer program which, when executed by the hardware processor, causes the hardware processor to:
   determine class prototypes of time series samples from a training dataset;
   encode a task corresponding to the time series samples, having a measurement of an optical communications signal that includes one or more of data obtained after polarization decomposition and data obtained after digital signal processing, using the class prototypes and a task-level configuration that includes configuration parameters relating to an environment of an optical communications network;
   determine a likelihood value based on outputs of a time series density model, a task-class distance from a task embedding model, and a task density model; and
   adjust parameters of the time series density model, the task embedding model, and the task density model responsive to the likelihood value.

10. The system of claim 9, wherein the computer program further causes the hardware processor to encode the time series samples into a vector representation before determining the class prototypes.

11. The system of claim 9, wherein the computer program further causes the hardware processor to encode task level features that include the task-level configuration and to encode task instance features by aggregating the class prototype.

12. The system of claim 9, wherein the task density model determines a task density as a probability of a task given a cluster center and a covariance matrix of a cluster.

13. The system of claim 9, wherein the time series density model determines a time series density as a probability of a time series sample based on a class prototype and a covariance matrix of a class.

14. The system of claim 9, wherein the task-class distance is determined as a maximum of a distance between a prototype and a set of optimal class prototypes.

15. The system of claim 9, wherein the likelihood value has a lower bound:

$$\ell_L(\mathcal{D}_\tau; \theta, w) = \frac{1}{N}\sum_{i=1}^{n}\left(\log p_{\theta,w}(e_i \mid y_i) + \mathbb{E}_{v_\tau \sim q_\phi(v_\tau \mid \mathcal{D}_\tau^s)}\left[\log p_w(y_i \mid v_\tau) + \log \sum_{z_\tau=1}^{r} p(v_\tau \mid z_\tau)p(z_\tau)\right]\right) + H(q_\phi(v_\tau \mid \mathcal{D}_\tau^s))$$

where H(•) is an entropy function, N is a number of classes, $p_{\theta,w}(e_i|y_i)$ is a probability of an embedding $e_i$ given a sample $y_i$ with model parameter θ and trainable parameters w, $\mathbb{E}$ is an expectation function, $v_\tau$ is an embedded representation of task τ, $D_\tau^s$ is a set of training support samples, $q_\phi(•)$ is an approximated posterior with inference network ϕ, $z_\tau$ is a latent task variable, and r is a hyperparameter of a number of components in a mixture distribution.

16. The system of claim 9, wherein the computer program further causes the hardware processor to determine a new task-level configuration that reflects configuration parameters relating to a new environment, to adapt to the new environment.

* * * * *